July 10, 1951 S. L. CASELLA 2,559,941
AUTOMATIC STOCK FEEDING MECHANISM FOR LATHES
Filed Aug. 7, 1944 6 Sheets-Sheet 1

Fig.1

INVENTOR.
Secondo L. Casella
BY
ATTORNEY

July 10, 1951 S. L. CASELLA 2,559,941
AUTOMATIC STOCK FEEDING MECHANISM FOR LATHES
Filed Aug. 7, 1944 6 Sheets-Sheet 2

INVENTOR.
Secondo L. Casella
BY
J. B. Felshin
ATTORNEY

July 10, 1951

S. L. CASELLA 2,559,941

AUTOMATIC STOCK FEEDING MECHANISM FOR LATHES

Filed Aug. 7, 1944

INVENTOR
Secondo L. Casella
BY
J. B. Felshin
ATTORNEY

Patented July 10, 1951

2,559,941

UNITED STATES PATENT OFFICE 2,559,941

AUTOMATIC STOCK FEEDING MECHANISM FOR LATHES

Secondo L. Casella, Brooklyn, N. Y., assignor to Morey Machinery Co. Inc., New York, N. Y., a corporation Application August 7, 1944, Serial No. 548,337

25 Claims. (Cl. 29—62)

This invention relates to lathes. It is particularly directed to hydraulic means to control the bar feed through the spindle of a turret lathe.

An object of this invention is to provide in a machine of the character described, a spindle having a head, a collet within the head, a collet sleeve to press the collet into the head, a feed finger tube within the collet sleeve to receive the bar stock, a collet lock surrounding the spindle sleeve for locking and releasing the collet, and improved hydraulic means for automatically and sequentially retracting the feed finger tube, releasing the collet lock, advancing the feed finger tube to push the bar stock through the collet, and locking the collet lock.

A further object of this invention is to provide in a machine of the character described adjustable means to regulate the length of bar stock advanced for each operation.

Yet another object of this invention is to provide in a machine of the character described a motor operated pump for pumping oil to the hydraulic control, and means to operate the pump for a predetermined period of time only, each time the machine is set for advancing the bar stock.

Another object of this invention is to provide in a machine of the character described means to merely open the collet lock and let it remain open whereby to permit insertion of new bar stock into the spindle, and means to thereafter close the collet lock.

Yet another object of this invention is to provide hydraulic control for a machine of the character described which shall be relatively inexpensive to manufacture, smooth and positive in operation, easy to adjust and manipulate, and yet practical, accurate and efficient to a high degree in use.

Although the invention is described in relation to a lathe, it will be understood that the hydraulic mechanism described herein may be used to control any pair of objects adapted to move in opposite directions.

Other objects of this invention will in part be obvious and in part hereinafter pointed out.

The invention accordingly consists in the features of construction, combinations of elements, and arrangement of parts which will be exemplified in the construction hereinafter described and of which the scope of application will be indicated in the following claims.

In the accompanying drawing, in which is shown various possible illustrative embodiments of this invention.

Referring now in detail to the drawing, 10 designates a lathe embodying the invention. The lathe is of the turret type which has a spindle. The same comprises a head stock casing 11 in which there is supported for rotation in any suitable manner, not shown, a spindle 12 passing through the head stock. At the front end of the spindle is a spindle head 14 provided with a frustoconical opening 15. Within the spindle is a collet 16 adapted to be closed when the collet is pushed forwardly into the opening 15. Within the spindle 12 is a bar feed tube 17 adapted to push the collet 16 into locking position. Within bar feed tube 17 is a feed finger tube 18 through which the bar stock passes. The bar stock is of course adapted to pass through the collet 16 and to be locked thereby to the spindle, when the collet 16 is pushed forwardly by bar feed tube 17.

Screwed to the forward end of feed finger tube 18 is a feed finger 20 provided at its forward end with a slit 21. When tube 18 is retracted, feed finger 20 will slide back on the bar stock. When tube 18 is advanced to the right, looking at Fig. 9, the bar is advanced by the feed finger 20 and pushed through the collet.

On the feed finger tube 18 are a pair of feed finger tube nuts 22. On the inside of each nut and surrounding the tube 18 is a pair of spaced ball bearings 23. Spindle 12 is formed at its rear end with a pair of longitudinal, diametrically disposed slots 12a extending to its rear end. Said spindle is furthermore formed at its rear end with external threads 12b and internal threads 12c.

Means is provided to lock and release the collet 16. To this end there is mounted on feed finger tube 18 a movable ball retainer 25 having a tubular portion 25a received within spindle 12 and abutting the rear end of the bar tube 17. Member 25 is provided with a pair of diametrically opposed radial heads 25b projecting through slots 12a, and formed with a pair of diametrically opposed notches 25c. The notches 25c are semi-annular in cross-section and tapered radially, each forming substantially half of a frustoconical surface.

Also mounted on the spindle 12 is a longitudinally stationary ball retainer 26 disposed adjacent the longitudinally movable ball retainer 25. Member 26 has a cylindrical portion 26a at one end similar to the outer diameter of the head 25b of member 25, and likewise formed with a pair of notches 26b complementary to notches 25c for the purpose hereinafter appearing. Member 26 is formed with radial fingers 26e projecting into slots 12a of the spindle.

Extending from cylindrical wall 26a is a frustoconical wall 26c increasing in diameter away from member 25. At the end of portion 26c is a cylindrical portion 26d of a diameter greater than the diameter of portion 26a. Contacting member 26 and screwed onto threaded portion 12b of spindle 12, is an adjusting nut 27. Received on tube 18 and screwed within the threaded portion 12c of spindle 12 is a nut 28 to retain nut 27 in place. The external threaded portion of nut 28 is tapered to have a spreading effect on the slotted end of tube 18.

On spindle 12 is a ball cam 29 formed with an annular groove 30 adjacent one end thereof. The ball cam 29 is in the form of a sleeve surrounding spindle 12 and member 25, and in one position it also encloses member 26. The ball cam 29 is formed with a through opening 31 at one end receiving the spindle 12. At the other end the opening is enlarged as at 32 forming a cylindrical surface 33 having a diameter somewhat larger than the outer diameter of head 25b.

Extending from surface 33 is an outwardly flaring cam surface 34 and extending from surface 34 is an enlarged cylindrical surface 35 somewhat greater than the outer diameter of portion 26d of the stationary ball retainer 26.

Within the complementary notches 25c, 26b are a pair of complementary steel balls 36.

Figures 9, 9A, 9B, 10:
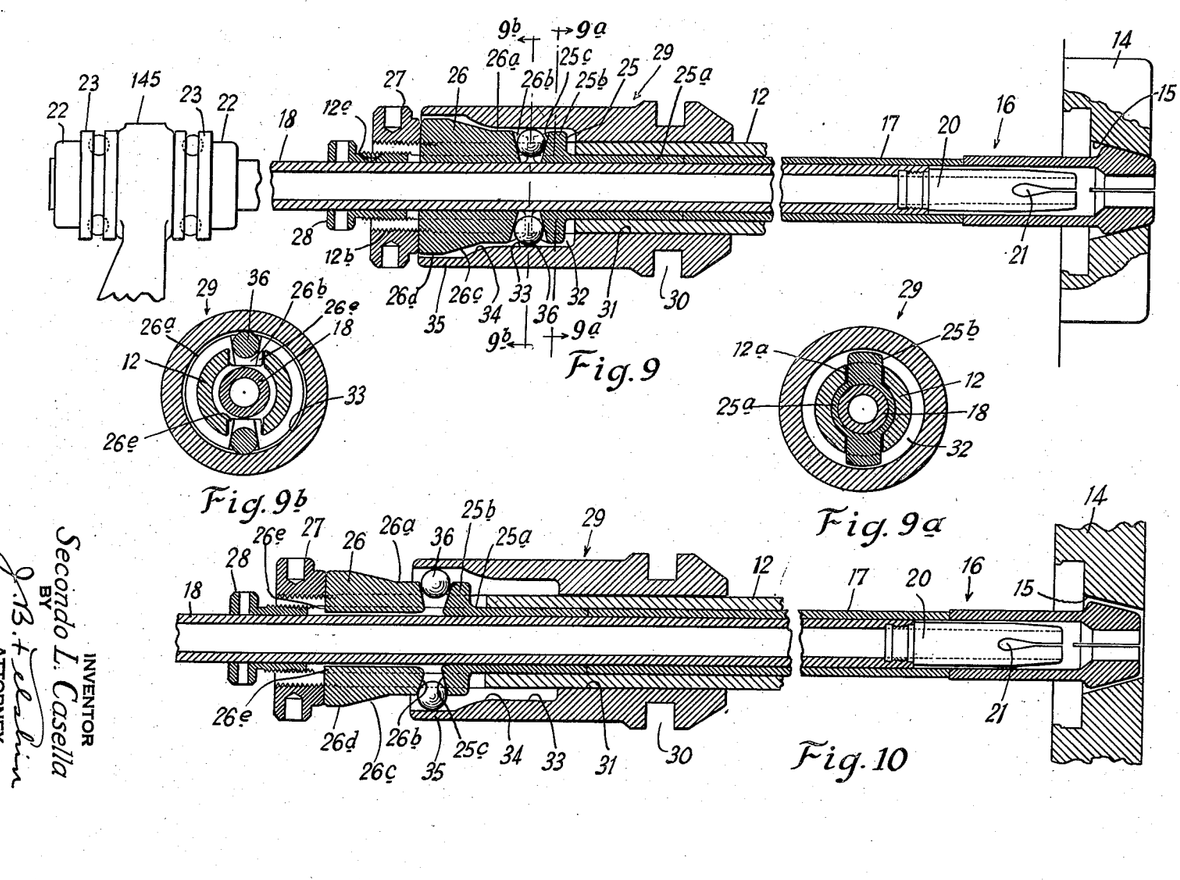
Fig. 9 is an elevational cross-sectional view through the spindle, showing the collet lock in locked position.
Fig. 9a is a cross-sectional view taken on line 9a—9a of Fig. 9.
Fig. 9b is a cross-sectional view taken on line 9b—9b of Fig. 9.
Fig. 10 is a view similar to Fig. 9 but showing the collet lock in open position.

It will now be understood that when the ball cam 29 is moved to the left, the balls 36 are pressed inwardly by cams 34 and surface 33, causing the movable ball retainer to be moved to the right, looking at Fig. 9, thereby pushing bar feed tube 17 against collet 16 to lock the collet on the bar stock passing therethrough. When member 29 is moved to the right, however, to the position shown in Fig. 10 the balls move outwardly permitting the movable ball retainer 25 to move to the left to thus release the collet. It will be understood, moreover, that when the feed finger tube 18 is moved to the left the feed finger 20 will slide on the bar stock, and when it is moved to the right the bar stock will be advanced thereby through the collet.

In accordance with the present invention, improved hydraulic means is provided to automatically and sequentially move the feed finger tube 18 to the left a predetermined distance, move the ball cam 29 to the right to release the collet, move the feed finger 18 to the right to advance the bar stock through the collet a predetermined distance, and move the ball cam to the left to again lock the collet. To this end there is attached to the rear of the head stock casing, a bar feed cover 40. Attached to the bar feed cover 40 is a lower bracket plate 41 and also an upper bracket plate 42. The upper bracket plate 42 is formed with a horizontal transverse through opening 43. The bracket plates may be attached to member 40 in any suitable manner. Attached to the lower and upper bracket plates 41, 42 is a body 45 comprising a main body portion 46 and a pair of parallel lower and upper extensions 47, 48 extending therefrom and attached to the lower and upper bracket plates 41, 42 respectively. Body 45 is formed with an upper horizontal longitudinal opening 49 and a lower opening 50 parallel thereto. Opening 49 extends to the left end of the body, but terminates short of the right end thereof. Opening 49 is disposed within the extension 48 of body 45. Opening 50 is disposed between the extensions 47 and 48 of the body. The body 45 is furthermore formed with a pair of parallel horizontal through bores or passages 52 and 53 parallel to opening 49 and at the same level therewith, and disposed on opposite sides thereof. Said body is furthermore formed with a pair of parallel through openings 55 and 56 parallel to and disposed on opposite sides of opening 50. Openings 52 and 53 are connected adjacent one end by passages 57 and 58 with one end of passage 49. The opposite ends of openings 52, 53 are connected by Z-shaped passages 60 and 61 with the opposite end of opening or passage 49. Openings 55 and 56 are connected by passages 62 and 63 with one end of opening 50 and by passages 65 and 66 with the other end of passage or opening 50.

The casting or body 45 is provided with an inlet opening 67 adjacent the bottom thereof and at one end thereof connected to a suitable hydraulic pump operated by an electric motor. Opening 67 is connected by passage 68 to openings 56 and 53 and communicating with ports or passages 63 and 58. Opening 67 also communicates with a passage 70 connected with openings 52 and 55 and the passages 60 and 65. An outlet passage 71 is provided communicating with passages 56 and 53 and the openings 61 and 66. A second outlet passage 72 is provided communicating with openings 52 and 55 and the passages 57 and 62. The outlet passages 71 and 72 communicate with a passage 73 which is connected to the inlet end of the hydraulic pump.

Attached to body 45 is a piston rod cap 75 formed with a through opening 76. Passing through said through opening is a bar feed piston 77. Said bar feed piston comprises a piston head 78, a piston rod or shank portion 79 extending therefrom, and a piston rod or shank portion 80 of reduced diameter extending from portion 79. The piston head reciprocates in opening 49. Rod portion 79 passes through opening 76. Attached to the piston rod cap 75 is a piston rod gland 81.

The rear end of opening 50 is closed by a cap 82 attached to body 45. Attached to the opposite end of body 45 is a piston rod cap 83 having a portion fitting into the rear end of opening 50. Member 83 is formed with a through opening 84. Extending through the opening is a collet lock piston 85. The same is formed with a head 86 disposed within opening 50 and with a shank 87 passing through opening 84, and with a shank portion 88 of reduced diameter adjacent its forward end.

Attached to the body 45, at opposite ends of through opening 52, are valve caps 90 and 91, respectively, formed with through openings aligned with said opening 52. In valve cap 90 is formed an enlarged opening 90a for a packing 90b. It is also formed with a socket 90c extending from enlarged opening 90a and communicating with said enlarged opening. At the outer end of the valve cap is opening 90d of reduced diameter. Valve cap 91 has an enlarged opening 91a for a similar packing 90a, a socket 91c communicating with opening 91a. At the outer end of the cap is opening 91e.

Within opening 52 is a bushing 93. The bushing contacts packings 90b and 91b within the valve caps 90 and 91 and therefore does not shift within opening 52. Bushing 93 is formed with a pair of aligned similar slots 94 and 95, aligned on the outer side of the bushing and communicating with passages 57 and 60, respectively, on one side of the bushing. Said bushing is also formed with similar aligned slots 97 and 98 located on the opposite side of the bushing and communicating with passages 57 and 60, respectively, on the opposite side of the bushing.

Figure 6:
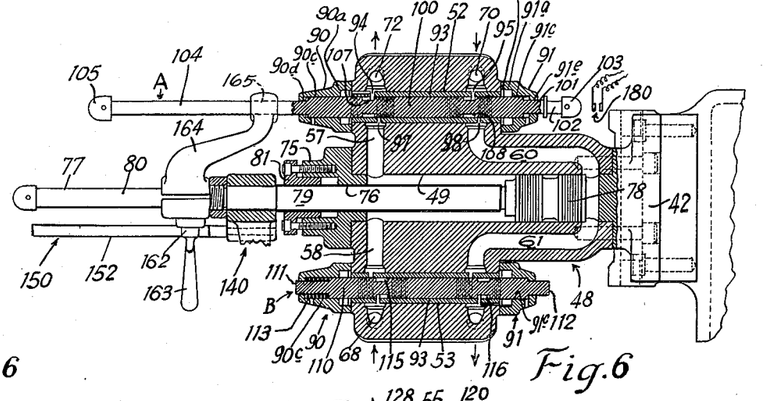
Fig. 6 is a cross-sectional view taken on line 6—6 of Fig. 5.

The slots 97 and 98 are staggered or offset with respect to the slots 94 and 95 respectively as shown in Fig. 6 of the drawing. The bushing 93 is of greater diameter than the passages 57 and 60 so as to block the passage except as the liquid can pass through the bushing in the manner hereinafter described.

Extending through the bushing and the valve caps 90, 91 is a valve spool A. The spool A comprises a portion 100 disposed within the bushing and extending into sockets 90c and 91b. At one end of portion 100 is a portion 101 passing through opening 91e in valve cap 91. Portion 101 is formed with an annular groove 102. At the end of portion 101 is a valve spool cap 103. At the opposite end of portion 100 is a portion 104 of reduced diameter extending through opening 90d of valve cap 90. At the outer end of portion 104 is a cap 105. Portion 100 is formed with a pair of annular grooves 107, 108, each being of such length that in one position of the valve spool A, communication is established between slots 94 and 97 and 95 and 98; whereas in another position (as shown in Fig. 6) the valve spool closes the slots 97, 98 to prevent passage of liquid through the passages 57 and 60 respectively. When the valve spool A is moved to the left, it closes the passages 57, 60 and when it moves to the right, said passages are opened.

In opening 53 is also a bushing 93 formed with pairs of opposite offset slots. At the ends of opening 53 are valve caps 90 and 91. Extending through the valve bushing 93 in valve caps 90, 91 is a valve spool B. Said valve spool B comprises a portion 110 passing through the bushing and projecting into socket portions 90c and 91c of the valve caps 90, 91. At the ends of portion 110 are end portions 111 and 112 passing through the reduced openings in the valve caps. Within socket 90c of valve cap 90 is a coil compression spring 113 interposed between portion 110 and the end of the socket and urging the valve spool B to the right. Portion 110 is formed with annular grooves 115 and 116. The valve spool B is normally closed as shown in Fig. 6 of the drawing. However, upon pushing the valve spool B to the left communication is established between the opposite pairs of slots through the notch grooves 115 and 116 to permit passage of liquid through the passages 68 and 61.

Figure 7:
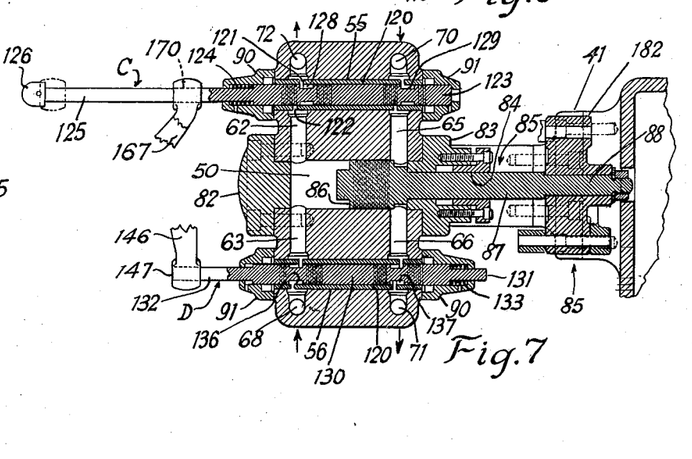
Fig. 7 is a cross-sectional view taken on line 7—7 of Fig. 5.
Figure 8:
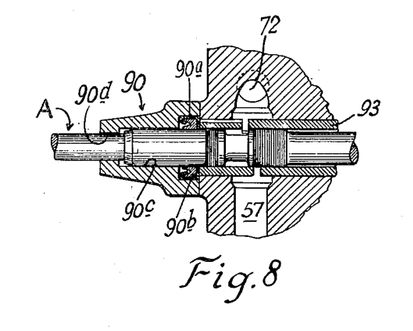
Fig. 8 is a partial, enlarged, cross-sectional view of one of the valve rods shown in Fig. 6.

In opening 55 is a bushing 120. Attached to the body at the ends of opening 55 are valve caps 90 and 91. Bushing 120 is formed with pairs of offset oppositely disposed slots 121 and 122. The slots 121 are offset from the slots 122. Passing through bushing 120 is a valve spool C. The same comprises a portion 123 disposed within the bushing and the valve caps 90 and 91. Interposed between one end of portion 123 and the end of cap 90 is a coil compression spring 124 normally urging the valve spool C to the right into contact with the valve cap 91. Extending from portion 123 of valve spool C is a reduced shank 125 passing through the cap 90. At the end of portion 125 is a cap 126. The spring 124 normally maintains valve spool C closed. Body 123 is formed with a pair of annular grooves 128 and 129 adapted in one position of the valve spool to establish communication between the slots 121 and 122, and in another position to shut off communication between said slots. As shown in Fig. 7 spring 124 pushes spool C to the right to break communication between slots 121 and 122 and thereby close the passages 62 and 65. When the valve spool is moved to the left in the manner hereinafter appearing passages 62 and 65 open to the passages 72 and 70 respectively.

In opening 56 is also a bushing 129. At the left end of opening 56 there is attached to the body a valve cap 91. At the opposite end of said opening 56 there is attached to the body a valve cap 90. Extending through the bushing 129 and the valve caps 90, 91 is a valve spool D. Valve spool D has a body portion 130. At one end of body 130 is a stem 131 passing through the end opening in cap 90. At the other end of body 130 is a stem 132 passing through the end opening in cap 91. Interposed between body 130 and the bottom of the socket in cap 90 is a coil compression spring 133 engaging a shoulder on body 130 and normally urging spool D to the left. Body 130 is formed with a pair of spaced annular grooves 136 and 137. In the position shown in Fig. 7 the grooves 136 and 137 establish communication between the slots in the bushing 120 and therefore maintain the passages 63 and 66 in communication with the passages 68 and 71 respectively.

When pressure against valve spool D is released, in the manner hereinafter appearing, spring 133 moves said valve spool to the left for closing communication between passages 63 and 66 and passages 68 and 71 respectively.

Mounted on shank portion 79 of piston rod 77 is a bracket 140. Bracket 140 has a split annular portion 141 formed with a through opening to receive the piston rod. The split portion may be clamped on the rod by means of a screw 143. Extending upwardly from the annular portion 141 is an arm 144. At the upper end of arm 144 is an annular collar 145 disposed between the thrust bearings 23 and receiving therethrough the feed finger tube 18.

Inclined downwardly and to the right from portion 141 is an arm 146 having a head 147 at its outer end aligned with valve spool D. Portion 141 of member 140 is also formed with a longitudinal through opening 149.

Mounted on member 140 is a scale 150. The scale 150 has a stem extending through opening 149 and a shank 152 marked with a scale in inches beginning from the left end of shank 152.

Adjustably mounted on shank 80 of piston rod 77 is valve bracket 160. Valve bracket 160 is formed with a split ring portion 161 receiving said shank 80. Bracket 160 may be moved lengthwise on shank 80 and then clamped in any desired position. The position of bracket 160 is read on the scale 150. The greater the length of bar stock it is desired to feed for each operation, the more the bracket 160 is adjusted to the right. The scale 150 indicates the length of the bar fed for each operation. After the bracket is adjusted to the desired position (by reading the scale 150), it may be clamped in place by a screw clamp 162 provided with a handle 163 inclined downwardly and to the right.

Figure 2:
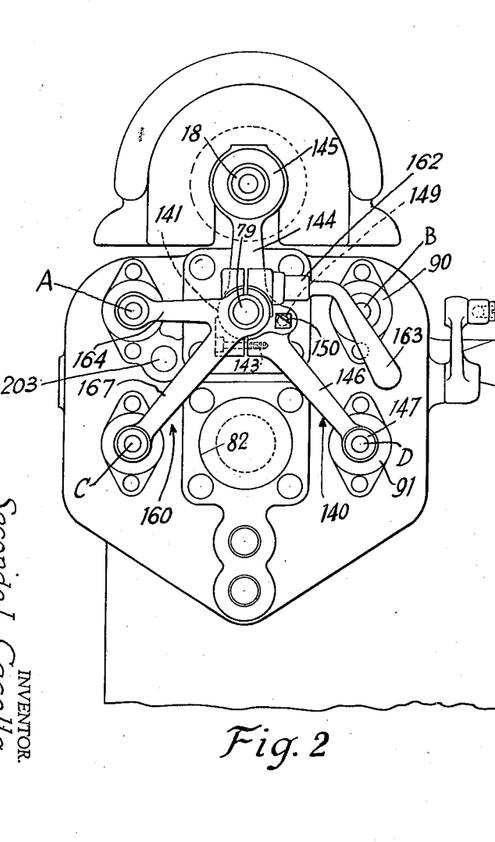
Fig. 2 is a rear end view thereof.

Bracket 160 furthermore comprises an arm 164 located in a horizontal plane but inclined to the right. Arm 164 is formed at the outer end thereof with a through opening 165 slidably receiving shank 104 of spool A. Said bracket 160 further comprises an arm 167 inclined downwardly and to the left as shown in Fig. 2 of the drawing. Arm 167 is inclined to the left looking at Fig. 7 of the drawing, and said arm is formed at the end thereof with a through opening 170 through which shank 125 of spool C slidably passes.

Figure 11:
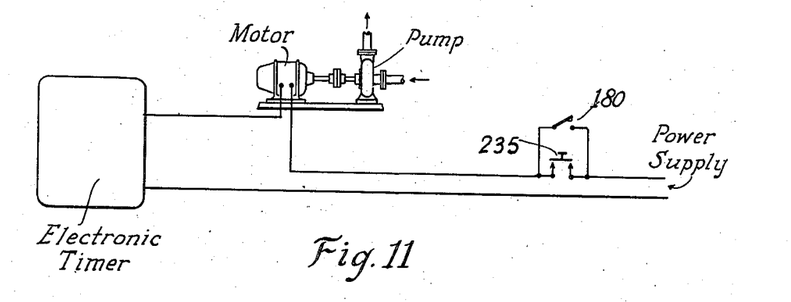
Fig. 11 is a wiring diagram showing the electric control for the pump motor.
Figure 12:
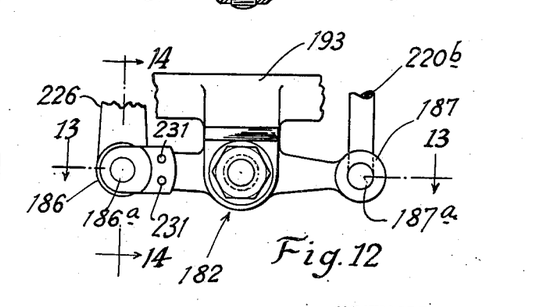
Fig. 12 is an elevational view of a detail.
Figure 13:
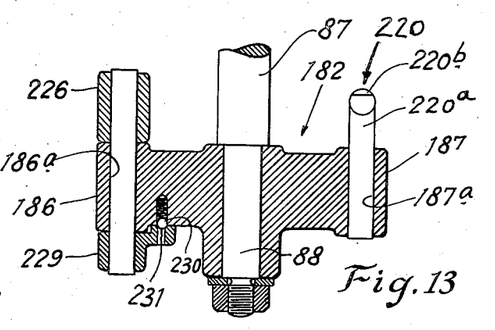
Fig. 13 is a cross-sectional view taken on line 13—13 of Fig. 12.
Figure 14:
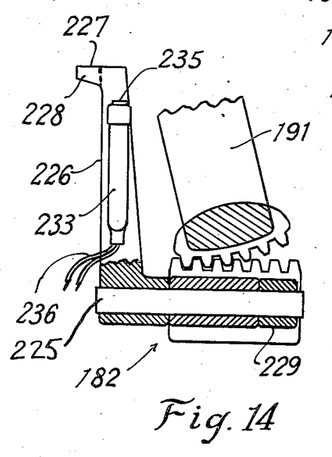
Fig. 14 is a cross-sectional view taken on line 14—14 of Fig. 12.

Adjacent the right end of spool A and spaced somewhat therefrom is a normally open switch 180 adapted to be closed upon moving spool A a short distance to the right. Switch 180 is adapted to close a circuit to an electronic timer (Fig. 11), of usual construction, for operating the pump motor for a predetermined length of time for which the electronic timer is set. When switch 180 is closed the electronic timer closes the circuit for the motor, and the motor operates the hydraulic pump for a predetermined period of time to pump liquid to the inlet passage 67 and passages 68 and 70. The time for which the operation of the motor is set is greater than it takes to go through a complete sequence of operation for retracting the bar feed tube, releasing the collet lock, advancing the bar feed tube, and then again locking the collet lock.

Means is provided to operate the collet lock from the piston 85. To this end there is mounted on shank portion 88 of piston 84 a gear segment yoke rack 182. The same comprises a central portion 183 formed with an opening 184 to receive a portion of the piston rod. At the upper end of the central portion 183 is a rack 185. Extending outwardly from central portion 183 are wings 186 and 187 formed with horizontal parallel through openings 186a and 187a, respectively. Member 182 is fixed to the piston rod 84 for movement therewith.

Extending through opening 43 in the upper plate bracket 42 is a horizontal pivot shaft 190. The pivot shaft extends beyond the ends of the plate bracket and pivoted thereon is a gear segment yoke 191. Said yoke is in the form of a lever and comprises two symmetrical side arms 192 interconnected at the bottom by an interconnecting portion 193. On portion 193 is a segmental gear 194 meshing with rack 185. The arms 192 have openings to receive the outer ends 190a of shaft 190. At their upper ends arms 192 are curved inwardly and formed with upwardly projecting portions 195 carrying pins 196 projecting into groove 30 of the ball cam 29.

Figure 1:
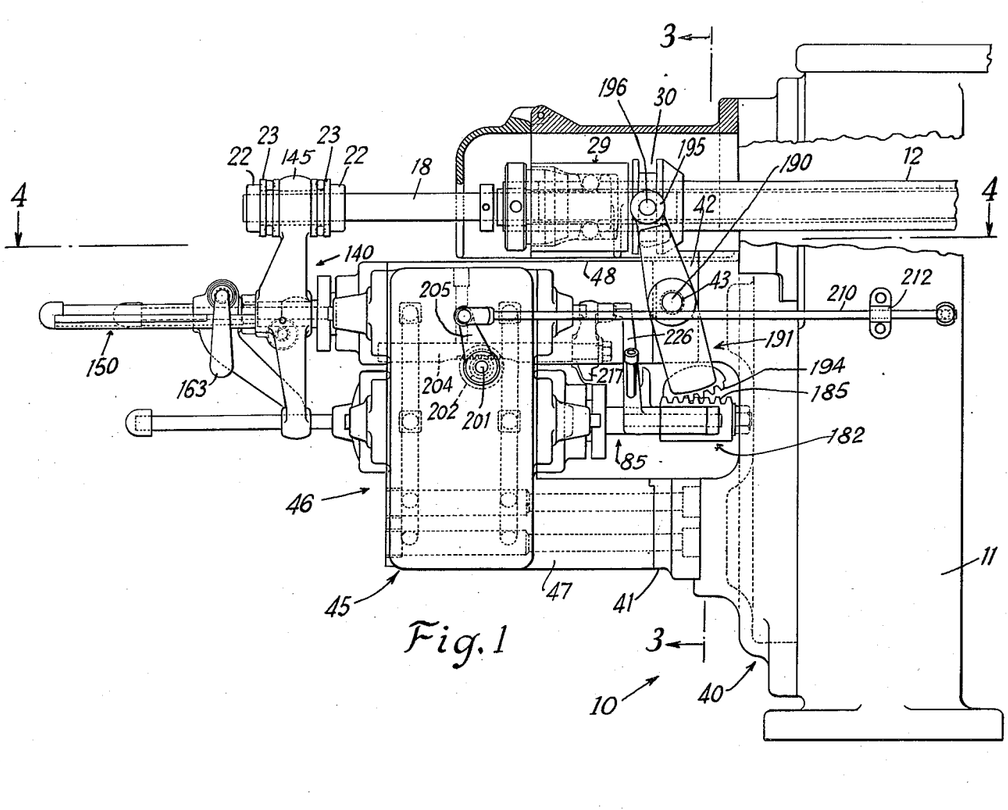
Fig. 1 is a side elevational view of the rear end of a lathe embodying the invention.

It will now be understood that when the collet piston 85 moves to the right it will rotate the yoke 191 in a counterclockwise direction looking at Fig. 1 of the drawing, and when said collet piston is shifted to the left it will rotate said yoke in a clockwise direction. Upon rotating the yoke in a clockwise direction the ball cam 29 is moved to the right from the position shown in Fig. 9 of the drawing to the position shown in Fig. 10 to release the collet.

As the lever rotates in an opposite direction the ball cam 29 will move from the position shown in Fig. 10 to the position shown in Fig. 9 causing the balls to be moved inwardly toward each other and hence causing shifting of the movable ball retainer to the right for locking the collet.

Means is provided for moving the valve spool A to the right to initiate the operation of the ball cam and bar feed control. To this end body 45 is formed with a horizontal transverse through opening 200. Extending therethrough is a pinion shaft 201. On said shaft is a pinion 202. Body 45 is furthermore formed with a longitudinal through opening 203 disposed above opening 200, and between the longitudinal axis of said body and spool valve A. Slidably mounted within said opening 203 is a rack plunger 204 meshing with pinion 202. Attached to one end of shaft 201 is a pinion shaft lever 205. Attached to the upper end of lever 205 is a starter rod 210 provided with a handle 211 at one end. Attached to the head stock is a bracket 212 through which the rod 210 slidably passes.

It will now be understood that upon engaging handle 211 and pulling the same to the right, lever 205 will be rocked in a clockwise direction looking at Fig. 1 to rotate shaft 201 and move the plunger rack 204 to the right.

Mounted on the outer end of the plunger rack 204 is a rack plunger arm 215 having an upward extension 216 receiving therethrough portion 102 of valve spool A. Extending downwardly from arm 215 is a lug 217 for the purpose hereinafter appearing.

It will now be understood that as the rack plunger 204 is moved to the right, arm 215 will move the valve spool A to the right to close switch 180 and open the ports in bushing 93 for opening passages 57 and 60 to the passages 72 and 70, respectively.

Figure 3:
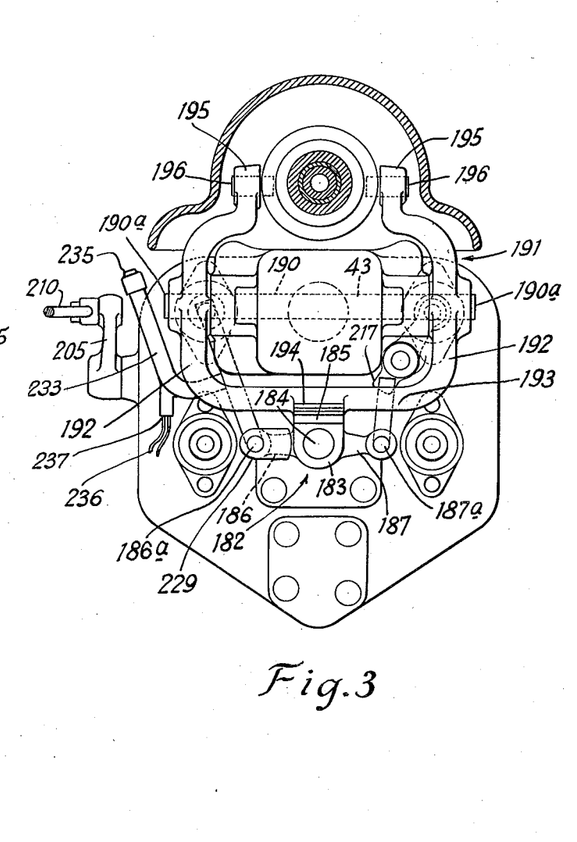
Fig. 3 is a cross-sectional view taken on line 3—3 of Fig. 1.
Figure 4:
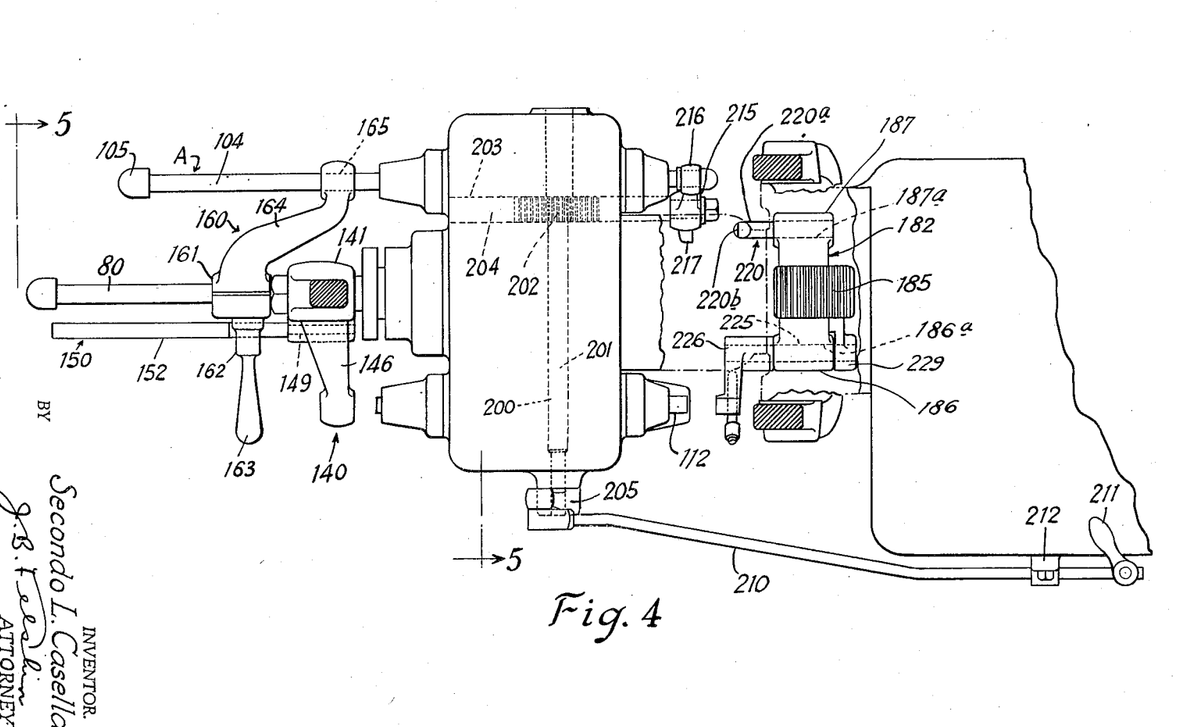
Fig. 4 is a cross-sectional view taken on line 4—4 of Fig. 1.
Figure 5:
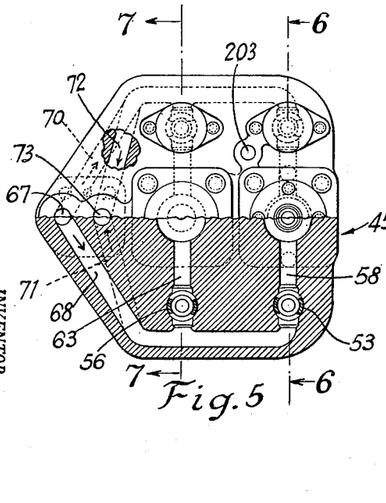
Fig. 5 shown on the drawing turned 90° clockwise is a cross-sectional view taken on line 5—5 of Fig. 4.

Engaged within the opening 187a of wing 187 formed on member 182 is a valve booster 220 having a horizontal arm 220a passing through the opening 187a and an upwardly extending arm 220b, the upper end of which is located in the path of lug 217 of member 215. Extending through opening 186a in member 182 is a shaft 225. Fixed to one end of shaft 225 is a lever 226. At the upper end of lever 226 is a projection 227 having an inner beveled face 228. Face 228 is normally in the path of valve spool B and is adapted to contact the rear end 112 thereof. Attached to the opposite end of shaft 225 is a sleeve 229. At one end of wing 186 is a spring pressed ball 230, and in member 229 are a pair of spaced sockets 231. Attached to lever 226 is a forwardly and upwardly curved handle 233. The handle 233 may be grasped and lever 226 swung in a counterclockwise direction looking at Fig. 3. The spring pressed ball 230 is adapted to engage in either of the two sockets 231 for retaining the lever in one of two positions, that is either in the position shown in Fig. 3 with the upper end of the lever in alignment with the rear end 112 of the valve spool B, or with the lever swung forwardly out of the way of said valve spool.

At the upper end of handle 233 is a push button switch 235 connected by wiring 236 extending through the handle and out thereof through an opening 237. The wiring 236 is connected in parallel with switch 180. Thus on either closing switch 180 or switch 235 the electronic control is energized for operating the motor for the pump for a period of two seconds or any other suitable predetermined period.

The operation of the structure disclosed herein will now be explained. Starting with the collet in locked position, and assuming that a portion of the bar stock has been cut away and it is desired to advance the bar stock for a predetermined distance, handle 163 may be loosened and member 160 moved to a desired position reading on the scale 150 to determine the length of bar stock it is desired to feed. The handle is then moved to clamping position. Handle 211 is then moved to the right to move the rack plunger 204 to the right causing movement of the valve spool A to the right for closing switch 180 and opening the valve ports in valve spool A. The pump then pumps liquid through inlet passage 67 to the passages 68 and 70. Upon opening the valve ports in valve spool A liquid is pumped from passage 70 to passage 60 around to the back of piston 78 causing the piston rod 77 to be shifted to the left thereby moving the feed finger tube 18 to the left and retracting the feed finger 20 on the bar stock which remains stationary in the locked collet. It will be noted that valve spool D remains normally open, whereby valve spools A, B and C are normally closed.

Movement of the piston 77 to the left releases pressure on valve spool D because arm 146 moves to the left with piston 77. Spring 133 then closes valve spool D. Movement of piston rod 77 to the left continues until arm 164 contacts the cap 105 to substantially close valve spool A and open the switch so that the operation of the pump will stop after a predetermined period. As piston rod 77 shifts to the left, liquid will pass out of passage 57 and passage 72 to the outlet passage 73 and back to the pump. At the same time arm 167, being in alignment with arm 164, contacts cap 126 to open valve spool C. Passage 65 then communicates with inlet passage 70 and liquid comes around to the back of piston 86 to move the collet piston 85 to the left pressing the liquid out of passage 62 and 72 to the outlet passage 73. Movement of member 85 to the left causes a rocking movement of the yoke 191 in a clockwise direction looking at Fig. 1 to move the ball cam 29 to the right and release the collet. This action also causes arm 220b of the member 220a to strike lug 217 of member 215 and fully close the valve spool A.

Lever 226 at the same time contacts valve spool B to open the same permitting inlet of the liquid through passage 68 and 58 to the opposite side of piston 78 for moving piston rod 77 to the right, thus causing the feed finger tube to move to the right for advancing the bar stock a predetermined distance. Movement of piston rod 77 to the right releases valve spool C which is then closed by spring action of spring 124. During this action valve spool A remains closed and when the outer end 147 of arm 146 contacts valve spool D the latter is opened against the spring pressure of spring 133. Such action then permits liquid to enter through passages 68, 63 to the opposite side of piston 86 to shift the collet stop piston 85 to the right for rotating the bell crank in an opposite direction, thereby moving the ball cam from the position shown in Fig. 10 to the position shown in Fig. 9 for again closing the collet.

During such action lever 226 moves away from valve spool B to permit closure of the latter on action of spring 113.

The machine is then back to its original condition.

It is possible to merely retract the ball cam to release the collet and leave the ball cam in such position. In order to do so, it is merely necessary to grasp handle 233, pull the shaft 226 forwardly before pulling the rod 210 to the right. After such action takes place, feed finger tube 18 will be retracted and the ball cam will thereafter be shifted to the right to release the collet. Since lever 226 is in the position described, it cannot open valve spool B, and no further action takes place.

A new bar rod may then be inserted in the spindle. Thereafter the machine can be caused to move to its normal position by swinging the lever 226 upwardly to its normal position, thereby causing engagement of the beveled surface 228 with one end of valve spool B to open it. Push button 235 is then pressed to operate the pump. Then the feed finger tube will be moved forwardly to advance the bar stock, and thereafter the ball cam will be moved back to the position shown in Fig. 9 to lock the collet.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In a lathe, a spindle, a collet within the spindle, releasable collet locking means including a member movable in one direction to lock the collet and in an opposite direction to release the collet, a feed finger tube within the spindle, a feed finger attached to the feed finger tube, and hydraulic means to retract the feed finger tube a predetermined distance, means controlled by retraction of the feed finger tube to move said member in said opposite direction to release the collet, means controlled by movement of said member in said opposite direction to advance the feed finger tube said predetermined distance, means controlled by advancement of said finger tube to move said member in said first direction to lock the collet, and means to adjust said predetermined distance.

2. In a lathe, a spindle, a collet within said spindle, a bar tube within said spindle adapted to push the collet to lock the same, a feed finger tube within said spindle, a feed finger attached to the feed finger tube, a stationary ball retainer on said feed finger tube, a movable ball retainer on said feed finger tube, and interposed between the stationary ball retainer and the bar tube, a ball interposed between the stationary ball retainer and a movable ball retainer, said stationary and movable ball retainers having cammed surfaces to receive the ball, whereby movement of the ball toward the axis of the spindle will press the movable ball retainer against the bar tube for locking the collet, and movement of the ball away from the axis of the spindle will release the collet, a ball cam surrounding the stationary and movable ball retainers, and having cam means to press the ball toward the axis of the spindle upon shifting the ball cam in one direction, to lock the collet, and movement of said ball cam in an opposite direction permitting release of the collet, hydraulic means for retracting the feed finger tube, hydraulic means controlled by the retracting means for moving the ball cam in a position to release the collet, hydraulic means controlled by the moving means for advancing the feed finger tube to move the bar stock through the released collet, and hydraulic means controlled by the advancing means for moving the ball cam in an opposite direction to lock the collet.

3. In a lathe, a spindle, a collet within said spindle, a bar tube within said spindle adapted to push the collet to lock the same, a feed finger tube within said spindle, a feed finger attached to the feed finger tube, a stationary ball retainer on said finger tube, a movable ball retainer on said feed finger tube, and interposed between the stationary ball retainer and the bar tube, a ball interposed between the stationary ball retainer and a movable ball retainer, said stationary and movable ball retainers having cammed surfaces to receive the ball, whereby movement of the ball toward the axis of the spindle will press the movable ball retainer against the bar tube for locking the collet, and movement of the ball away from the axis of the spindle will release the collet, a ball cam surrounding the stationary and movable ball retainers, and having cam means to press the ball toward the axis of the spindle upon shifting the ball cam in one direction, to lock the collet, and movement of said ball cam in an opposite direction permitting release of the collet, hydraulic means for retracting the feed finger tube, hydraulic means controlled by the retracting means for moving the ball cam in a position to release the collet, hydraulic means controlled by the moving means for advancing the feed finger tube to move the bar stock through the released collet, and hydraulic means controlled by the advancing means for moving the ball cam in an opposite direction to lock the collet, and means to adjust the distance that the feed finger tube is retracted by the retracting means and advanced by said advancing means.

4. In a lathe, a head stock, a spindle within the head stock, a collet in the spindle, a feed finger tube in the spindle, a body attached to the head stock of the lathe, a collet lock piston in said body, a rack on said piston, a pivoted yoke having a segmental gear meshing with the rack, means to lock the collet including a member slidably mounted on the spindle, means on the yoke to engage said member, a piston rod in said body, means on the piston rod connected to the feed finger tube, hydraulic means for shifting the piston rod in a direction to retract the feed finger tube, hydraulic means controlled by movement of the piston rod for shifting the collet lock piston in a direction for rotating the yoke to shift the member on the spindle in a direction for releasing the collet, hydraulic means controlled by movement of the collet lock piston for then shifting the piston rod in an opposite direction to advance the feed finger tube, and hydraulic means controlled by the piston rod for then shifting the collet lock piston in an opposite direction for rotating the yoke in a direction for shifting said member to a position for locking the collet.

5. In a lathe, a head stock, a spindle within the head stock, a collet in the spindle, a feed finger tube in the spindle, a body attached to the head stock of the lathe, a collet lock piston in said body, a rack on said piston, a pivoted yoke having a segmental gear meshing with the rack, means to lock the collet including a member slidably mounted on the spindle, means on the yoke to engage said member, a piston rod in said body, means on the piston rod connected to the feed finger tube, hydraulic means for shifting the piston rod in a direction to retract the feed finger tube, hydraulic means controlled by movement of the piston rod for shifting the collet lock piston in a direction for rotating the yoke to shift the member on the spindle in a direction for releasing the collet, hydraulic means controlled by movement of the collet lock piston for then shifting the piston rod in an opposite direction to advance the feed finger tube, and hydraulic means controlled by the piston rod for then shifting the collet lock piston in an opposite direction for rotating the yoke in a direction for shifting said member to a position for locking the collet, and means for adjusting the length of stroke of said piston rod.

6. In a lathe, a spindle, a feed finger tube for the spindle, a collet in the spindle, a body on the lathe, a piston in said body, means on said piston to control movement of the feed finger tube, a second piston in said body, means on the second piston to control locking and release of the collet, hydraulic means to move the first piston in a direction to retract the feed finger tube, means controlled by said movement of the first piston to move the second piston in a direction for releasing the collet, means controlled by movement of the second piston in a direction for releasing the collet, to cause the first piston to move in an opposite direction for advancing bar stock through the released collet, and means controlled by movement of the first piston in said opposite direction to move the second piston in a direction for locking said collet.

7. In a lathe, a spindle, a feed finger tube for the spindle, a collet in the spindle, a body on the lathe, a piston in said body, means on said piston to control movement of the feed finger tube, a second piston in said body, means on the second piston to control locking and release of the collet, hydraulic means to move the first piston in a direction to retract the feed finger tube, means controlled by said movement of the first piston to move the second piston in a direction for releasing the collet, means controlled by movement of the second piston to cause the first piston to move in an opposite direction for advancing bar stock through the released collet, and means controlled by movement of the first piston in said opposite direction to move the second piston in a direction for locking said collet, and means to initiate movement of the first piston in the first direction, including a normally closed valve, manual means to move the valve to open position, a motor, a pump operated thereby, and a switch controlling the operation of the motor, and said valve being adapted to actuate said switch upon being moved from closed to open position, said means for moving said pistons including passages in the body leading to opposite sides of said pistons, and receiving liquid from the pump and returning liquid to the pump.

8. In a lathe, a spindle, a feed finger tube for the spindle, a collet in the spindle, a body on the lathe, a piston in said body, means on said piston to control movement of the feed finger tube, a second piston in said body, means on the second piston to control locking and release of the collet, hydraulic means to move the first piston in a direction to retract the feed finger tube, means controlled by said movement of the first piston to move the second piston in a direction for releasing the collet, means controlled by movement of the second piston to cause the first piston to move in an opposite direction for advancing bar stock through the released collet, and means controlled by movement of the first piston in said opposite direction to move the second piston in a direction for locking said collet, and means to initiate movement of the first piston in the first direction, including a normally closed valve, manual means to move the valve to open position, a motor, a pump operated thereby, and a switch controlling the operation of the motor, and said valve being adapted to actuate said switch upon being moved from closed to open position, said means for moving said pistons including passages in the body leading to opposite sides of said pistons, for receiving liquid from the pump and returning liquid to the pump, said valve controlling one of said passages, and means to adjust the stroke of the first piston.

9. In a lathe, a spindle, a feed finger tube for the spindle, a collet in the spindle, a body on the lathe, a piston on said body, means on said piston to control movement of the feed finger tube, a second piston on said body, means on the second piston to control locking and release of the collet, hydraulic means to move the first piston in a direction to retract the feed finger tube, means controlled by said movement of the first piston to move the second piston in a direction for releasing the collet, means controlled by movement of the second piston to cause the first piston to move in an opposite direction for advancing bar stock through the released collet, and means controlled by movement of the first piston in said opposite direction to move the second piston in a direction for locking said collet, and means to vary the stroke of the first piston.

10. In combination, a spindle, a collet in the spindle, a feed finger tube in the spindle, a body, a piston mounted for reciprocation in the body, means on the piston to control the movement of the feed finger tube, a second piston in the body, means on the second piston to control the locking and releasing of said collet, said body having inlet passages communicating with opposite sides of each of said first and second pistons, and outlet passages communicating with opposite sides of each of said first and second pistons, valves to control said passages, and means on each piston to control the valves for the passages leading to opposite sides of the other piston.

11. In combination, a spindle, a collet in the spindle, a feed finger tube in the spindle, a body, a piston mounted for reciprocation in the body, means on the piston to control the movement of the feed finger tube, a second piston in the body, means on the second piston to control the locking and releasing of said collet, said body having inlet passages communicating with opposite sides of each of said first and second pistons, outlet passages communicating with opposite sides of each of said first and second pistons, valves to control said passages, and means on each piston to control the valves for the passages leading to opposite sides of the other piston, and manual means to move the valve controlling the passages leading to opposite sides of the first piston.

12. In combination, a spindle, a collet in the spindle, a feed finger tube in the spindle, a body, a piston mounted for reciprocation in the body, means on the piston to control the movement of the feed finger tube, a second piston in the body, means on the second piston to control the locking and releasing of said collet, said body having inlet passages communicating with opposite sides of each of said first and second pistons, outlet passages communicating with opposite sides of each of said first and second pistons, valves to control said passages, means on each piston to control the valves for the passages leading to opposite sides of the other piston, manual means to move the valve controlling the passages leading to opposite sides of the first piston, and means on the first piston to control the movement of said last-mentioned valve.

13. In combination, a spindle, a collet in the spindle, a feed finger tube in the spindle, a body, a piston mounted for reciprocation in the body, means on the piston to control the movement of the feed finger tube, a second piston in the body, means on the second piston to control the locking and releasing of said collet, said body having inlet passages communicating with opposite sides of each of said first and second pistons, outlet passages communicating with opposite sides of each of said first and second pistons, valves to control said passages, means on each piston to control the valves for the passages leading to opposite sides of the other piston, manual means to move the valve controlling the passages leading to opposite sides of the first piston, and means on the first piston to control the movement of said last-mentioned valve, said last means including a lost motion connection between said first piston and said last-mentioned valve.

14. In combination, a spindle, a collet in the spindle, a feed finger tube in the spindle, a body, a piston mounted for reciprocation in the body, means on the piston to control the movement of the feed finger tube, a second piston in the body, means on the second piston to control the locking and releasing of said collet, said body having inlet passages communicating with opposite sides of each of said first and second pistons, outlet passages communicating with opposite sides of each of said first and second pistons, valves to control said passages, means on each piston to control the valves for the passages leading to opposite sides of the other piston, manual means to move the valve controlling the passages leading to opposite sides of the first piston, means on the first piston to control the movement of said last-mentioned valve, said last means including a lost motion connection between said first piston and said last-mentioned valve, and means to adjust the length of said lost motion connection.

15. In combination, a spindle, a collet in the spindle, a feed finger tube in the spindle, a body, a piston mounted for reciprocation in the body, means on the piston to control the movement of the feed finger tube, a second piston in the body, means on the second piston to control the locking and releasing of said collet, said body having inlet passages communicating with opposite sides of each of said first and second pistons, outlet passages communicating with opposite sides of each of said first and second pistons, valves to control said passages, means on each piston to control the valves for the passages leading to opposite sides of the other piston, manual means to move the valve controlling the passages leading to opposite sides of the first piston, means on the first piston to control the movement of said last-mentioned valve, said last means including a lost motion connection between said first piston and last-mentioned valve, means to adjust the length of said lost motion connection, and scale means on said first piston to indicate the length of said lost motion connection.

16. In combination, a body formed with a pair of parallel cylindrical openings, a piston mounted for reciprocation within said openings and extending from said body, said body being formed with a pair of inlet and outlet passages communicating with each of opposite sides of each of said cylindrical openings, a first valve to control a pair of inlet and outlet passages communicating with opposite sides of the first cylindrical opening, a second valve to control the other pair of inlet and outlet passages communicating with opposite sides of the first cylindrical opening, spring means to normally urge the second valve to closed position, a third valve controlling a pair of inlet and outlet passages communicating with opposite sides of the second cylindrical opening, spring means to normally close the third valve, a fourth valve to control the other pair of inlet and outlet passages communicating with opposite sides of the second cylindrical opening, spring means to urge the fourth valve to close, means on the first piston to normally press the fourth valve to open position against its spring means, means on the first piston having lost motion connections with the first and third valves and adapted to move the first valve to closed position and to open the third valve against its spring upon moving the first piston in one direction, and means on the second piston movable therewith and adapted to open said second valve against its spring means.

17. In combination, a body formed with a pair of parallel cylindrical openings, a piston mounted for reciprocation within said openings and extending from said body, said body being formed with a pair of inlet and outlet passages communicating with each of opposite sides of each of said cylindrical openings, a first valve to control a pair of inlet and outlet passages communicating with opposite sides of the first cylindrical opening, a second valve to control the other pair of inlet and outlet passages communicating with opposite sides of the first cylindrical opening, spring means to normally urge the second valve to closed position, a third valve controlling a pair of inlet and outlet passages communicating with opposite sides of the second cylindrical opening, spring means to normally close the third valve, a fourth valve to control the other pair of inlet and outlet passages communicating with opposite sides of the second cylindrical opening, spring means to urge the fourth valve to close, means on the first piston to normally press the fourth valve to open position against its spring means, means on the first piston having lost motion connections with the first and third valves and adapted to move the first valve to closed position and to open the third valve against its spring upon moving the first piston in one direction, means on the second piston movable therewith and adapted to open said second valve against its spring means, and manual means to open the first valve for causing movement of the first piston in said direction.

18. In combination, a body formed with a pair of parallel cylindrical openings, a piston mounted for reciprocation within said openings and extending from said body, said body being formed with a pair of inlet and outlet passages communicating with each of opposite sides of each of said cylindrical openings, a first valve to control a pair of inlet and outlet passages communicating with opposite sides of the first cylindrical opening, a second valve to control the other pair of inlet and outlet passages communicating with opposite sides of the first cylindrical opening, spring means to normally urge the second valve to closed position, a third valve controlling a pair of inlet and outlet passages communicating with opposite sides of the second cylindrical opening, spring means to normally close the third valve, a fourth valve to control the other pair of inlet and outlet passages communicating with opposite sides of the second cylindrical opening, spring means to urge the fourth valve to close, means on the first piston to normally press the fourth valve to open position against its spring means, means on the first piston having lost motion connections with the first and third valves and adapted to move the first valve to closed position and to open the third valve against its spring upon moving the first piston in one direction, means on the second piston movable therewith and adapted to open said second valve against its spring means, and manual means to open the first valve for causing movement of the first piston in said direction, pump means to supply liquid under pressure to inlet passages in said body, and to receive liquid from the outlet passages of the body, and means controlled by the first valve to control the operation of said pump means.

19. In a lathe, a spindle, a collet within the spindle, a feed finger tube within the spindle, and manually initiable hydraulic means to retract the feed finger tube a predetermined distance, hydraulic means controlled by retraction of the feed finger tube to release the collet, hydraulic means controlled by the release of the collet to advance the feed finger tube said predetermined distance, and hydraulic means controlled by advance of the feed finger tube to lock the collet, and presettable means to release the collet without advancing the feed finger tube.

20. In combination, a body formed with a pair of parallel cylindrical openings, a piston mounted for reciprocation within said openings and extending from said body, said body being formed with a pair of inlet and outlet passages communicating with each of opposite sides of each of said cylindrical openings, a first valve to control a pair of inlet and outlet passages communicating with opposite sides of the first cylindrical opening, a second valve to control the other pair of inlet and outlet passages communicating with opposite sides of the first cylindrical opening, spring means to normally urge the second valve to closed position, a third valve controlling a pair of inlet and outlet passages communicating with opposite sides of the second cylindrical opening, spring means to normally close the third valve, a fourth valve to control the other pair of inlet and outlet passages communicating with opposite sides of the second cylindrical opening, spring means to urge the fourth valve to close, means on the first piston to normally press the fourth valve to open position against its spring means, means on the first piston having lost motion connections with the first and third valves and adapted to move the first valve to closed position and to open the third valve against its spring upon moving the first piston in one direction, and means on the second piston movable therewith and adapted to open said second valve against its spring means, said last-mentioned means being movable to a position where it is inoperative to open the second valve.

21. In combination, a body formed with a pair of parallel cylindrical openings, a piston mounted for reciprocation within said openings and extending from said body, said body being formed with a pair of inlet and outlet passages communicating with each of opposite sides of each of said cylindrical openings, a first valve to control a pair of inlet and outlet passages communicating with opposite sides of the first cylindrical opening, a second valve to control the other pair of inlet and outlet passages communicating with opposite sides of the first cylindrical opening, spring means to normally urge the second valve to closed position, a third valve controlling a pair of inlet and outlet passages communicating with opposite sides of the second cylindrical opening, spring means to normally close the third valve, a fourth valve to control the other pair of inlet and outlet passages communicating with opposite sides of the second cylindrical opening, spring means to urge the fourth valve to close, means on the first piston to normally press the fourth valve to open position against its spring means, means on the first piston having lost motion connections with the first and third valves and adapted to move the first valve to closed position and to open the third valve against its spring upon moving the first piston in one direction, means on the second piston movable therewith and adapted to open said second valve against its spring means, and manual means to open the first valve for causing movement of the first piston in said direction, pump means to supply liquid under pressure to inlet passages in said body, and to receive liquid from the outlet passages of the body, and means controlled by the first valve to control the operation of said pump means, the means on the second piston which is adapted to open the second valve being movable to a position where it is inoperative to open the second valve, and means on said means to open the second valve to control the operation of said pump means.

22. In combination, a body, a piston mounted for reciprocation in the body, a second piston in the body, said body having inlet passages communicating with opposite sides of each of said first and second pistons, and outlet passages communicating with opposite sides of each of said first and second pistons, valves to control said passages, means on each piston to control the valves for the passages leading to opposite sides of the other piston, manual means to move the valve controlling the passages leading to opposite sides of the first piston, and means on the first piston to control the movement of said last-mentioned valve, said last means including a lost motion connection between said first piston and said last-mentioned valve.

23. In combination, a body, a piston mounted for reciprocation in the body, a second piston in the body, said body having inlet passages communicating with opposite sides of each of said first and second pistons, and outlet passages communicating with opposite sides of each of said first and second pistons, valves to control said passages, means on each piston to control the valves for the passages leading to opposite sides of the other piston, manual means to move the valve controlling the passages leading to opposite sides of the first piston, means on the first piston to control the movement of said last-mentioned valve, said last means including a lost motion connection between said first piston and said last-mentioned valve, and means to adjust the length of said lost motion connection.

24. In combination, a body, a piston mounted for reciprocation in the body, a second piston in the body, said body having inlet passages communicating with opposite sides of each of said first and second pistons, and outlet passages communicating with opposite sides of each of said first and second pistons, valves to control said passages, means on each piston to control the valves for the passages leading to opposite sides of the other piston, manual means to move the valve controlling the passages leading to opposite sides of the first piston, means on the first piston to control the movement of said last-mentioned valve, said last means including a lost motion connection between said first piston and said last-mentioned valve, means to adjust the length of said lost motion connection, and scale means on the first piston to indicate the length of said lost motion connection.

25. In a lathe, a headstock, a spindle within said headstock, a collet in the spindle, a feed finger tube in the spindle, a body attached to the headstock, a collet lock piston in said body, a pivoted yoke having an arm connected to said piston, means to lock the collet including a member slidably mounted on the spindle, means on the other arm of said yoke to engage said member, a second piston in said body, means to connect the second piston to the feed finger tube, said pistons being parallel to one another, and hydraulic means to move the first piston in one direction for retracting the feed finger tube, means controlled by movement of the first piston in said direction to move the second piston in said direction for rotating the yoke and moving said member to release the collet, means controlled by movement of the second piston in said direction, to cause the first piston to move in an opposite direction for advancing the feed finger tube, means controlled by movement of the first piston in said opposite direction to move the second piston in said opposite direction for pivoting the yoke and sliding said member in a direction for locking the collet.

SECONDO L. CASELLA.

REFERENCES CITED

The following references are of record in the file of this patent:

UNITED STATES PATENTS

| Number | Name | Date |
|---|---|---|
| 1,604,116 | Drissner | Oct. 26, 1926 |
| 1,920,596 | Schafer | Aug. 1, 1933 |
| 2,054,296 | Merrill | Sept. 15, 1936 |
| 2,108,025 | Shaw | Feb. 8, 1938 |
| 2,116,376 | Anderson | May 3, 1938 |
| 2,120,495 | Harris | June 14, 1938 |
| 2,209,608 | Nye et al. | July 30, 1940 |
| 2,301,028 | Esch | Nov. 3, 1942 |
| 2,308,348 | Ballash | Jan. 12, 1943 |
| 2,310,259 | Ruppel | Feb. 9, 1943 |
| 2,316,926 | Willett | Apr. 20, 1943 |
| 2,352,184 | Bullard | June 27, 1944 |
| 2,360,007 | Muller | Oct. 10, 1944 |